United States Patent [19]
Bruce

[11] Patent Number: 5,452,673
[45] Date of Patent: Sep. 26, 1995

[54] ANHYDROUS AMMONIA KNIFE

[76] Inventor: Douglas G. Bruce, 2233 Fourth St., Perry, Iowa 50220

[21] Appl. No.: 247,876

[22] Filed: May 23, 1994

[51] Int. Cl.$^6$ .................................................. A01C 23/00
[52] U.S. Cl. ........................... 111/119; 111/123; 111/150; 111/190
[58] Field of Search ............................ 111/118, 119, 120, 111/121, 123, 124, 125, 150, 156, 190, 197, 126

[56] References Cited

U.S. PATENT DOCUMENTS

| | | |
|---|---|---|
| 2,612,827 | 10/1952 | Baggette et al. . |
| 2,619,054 | 11/1952 | Bell ............................................. 111/123 |
| 2,684,617 | 7/1954 | Johnston . |
| 2,736,279 | 2/1956 | Johnston ................................... 111/125 |
| 2,849,970 | 9/1958 | Coberly et al. . |
| 2,874,656 | 2/1959 | Bennett . |
| 3,092,052 | 6/1963 | Anderson ............................ 111/123 X |
| 3,157,139 | 11/1964 | Spindler ............................. 111/190 X |
| 3,227,226 | 1/1966 | Bayne ................................. 111/197 X |
| 3,605,657 | 9/1971 | Brannan ............................. 111/156 X |
| 3,745,944 | 7/1973 | Yetter et al. ........................ 111/190 X |
| 4,201,142 | 5/1980 | Stump ..................................... 111/123 |
| 4,355,589 | 10/1982 | Wetmore ................................ 111/123 |
| 4,616,580 | 10/1986 | Moore et al. . |
| 4,719,862 | 1/1988 | Edmission ........................... 111/119 X |
| 5,271,342 | 12/1993 | Neidhart .................................. 111/119 |

*Primary Examiner*—Randolph A. Reese
*Assistant Examiner*—Victor Batson
*Attorney, Agent, or Firm*—Henderson & Sturm

[57] ABSTRACT

An anhydrous ammonia knife including a shank attached to an implement tool bar, a knife segment attached to the forward edge of the shank, and an ammonia delivery tube disposed between the forward edge of the shank and the leading edge of the knife segment. The knife selectively penetrates the soil to a predetermined depth and the tube discharge end is disposed in fluid communication with the soil. Ammonia is discharged into the soil at a position immediately behind the leading edge of the knife segment as the furrow is first opened. This positioning minimizes the amount of ammonia vapor lost to the atmosphere since the ammonia is quickly entrapped in the soil.

9 Claims, 1 Drawing Sheet

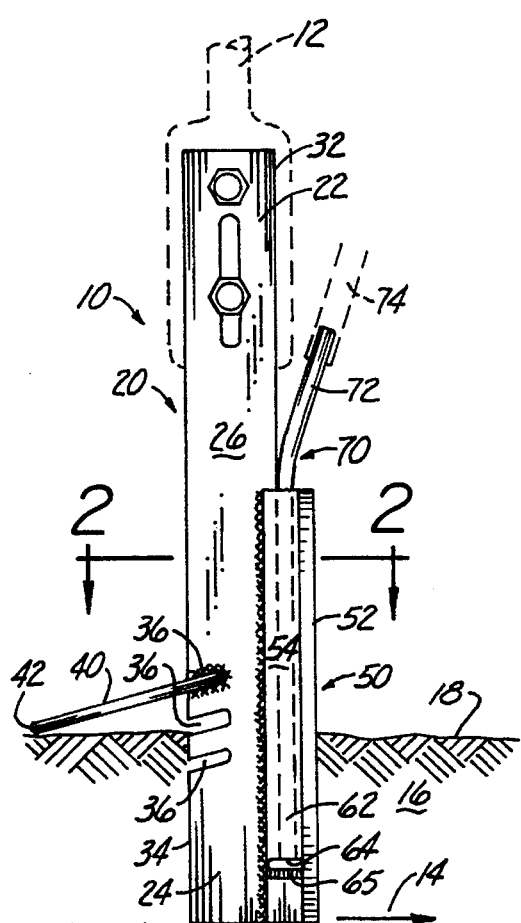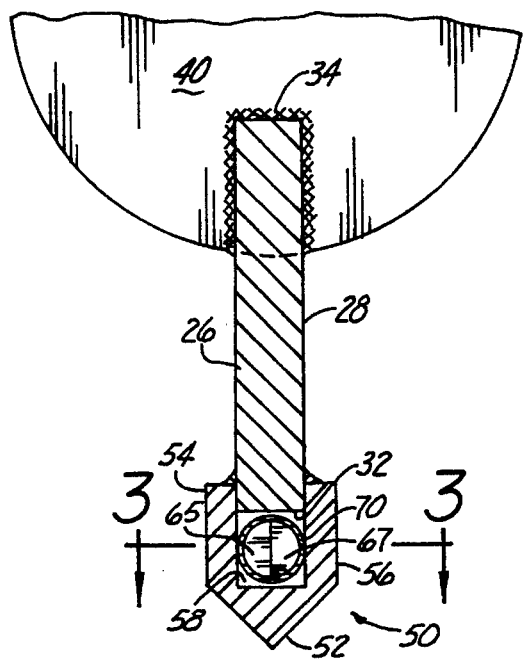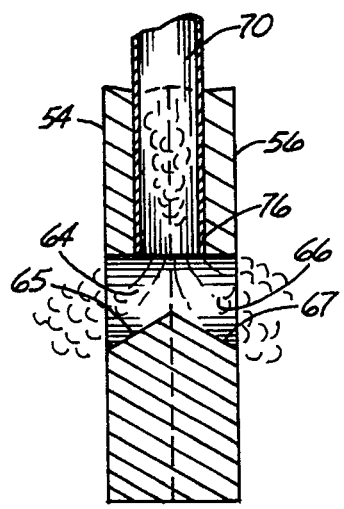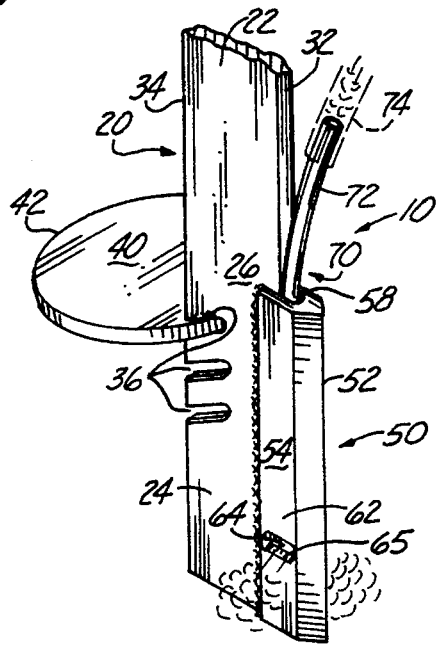
Fig. 1
Fig. 2
Fig. 3
Fig. 4

ANHYDROUS AMMONIA KNIFE

TECHNICAL FIELD

This invention relates to agricultural implements, and more particularly to a tool for applying additives, such as fertilizer, to the soil.

BACKGROUND ART

Proper soil management periodically requires the injection of additives into the soil at predetermined depths. One such additive is anydrous ammonia used to supply available nitrogen for crops. Anhydrous ammonia is stored in tanks under pressure to maintain it in liquid form. When discharged from storage tanks, a substantial portion of the anhydrous ammonia vaporizes and is lost to the atmosphere unless it is entrapped in the soil.

Anhydrous ammonia is generally applied to the soil at a depth of about 3–5 inches by anhydrous ammonia knives. A number of knives are mounted on an implement tool bar and spaced on the bar at intervals perpendicular to the direction of travel over the field. A delivery tube, typically mounted on the rear edge of each knife, carries anhydrous ammonia from an implement storage tank and discharges it at an outlet below the surface of the soil. As the implement travels forward over the field, each knife cuts a furrow in front of the delivery tube discharge and a regulated amount of ammonia is deposited in the furrow. As the ammonia discharges from the tube it is typically 75–85% liquid and 15–25% gas. To avoid loss of the ammonia gas, it must be promptly and effectively entrapped in the soil.

Those concerned with these and other problems recognize the need for an improved anhydrous ammonia knife.

DISCLOSURE OF THE INVENTION

The present invention provides an anhydrous ammonia knife including a shank attached to an implement tool bar, a knife segment attached to the forward edge of the shank, and an ammonia delivery tube disposed between the forward edge of the shank and the leading edge of the knife segment. The knife selectively penetrates the soil to a predetermined depth and the tube discharge end is disposed in fluid communication with the soil. Ammonia is discharged into the soil at a position immediately behind the leading edge of the knife segment as the furrow is first opened. This positioning minimizes the amount of ammonia vapor lost to the atmosphere since the ammonia is quickly entrapped in the soil.

An object of the present invention is the provision of an improved anhydrous ammonia knife.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a side elevational view of the anhydrous ammonia knife of the present invention illustrating the knife penetrating the soil to a predetermined depth;

FIG. 2 is an enlarged sectional view taken along line 2—2 of FIG. 1;

FIG. 3 is a sectional view taken along line 3—3 of FIG. 2; and

FIG. 4 is a partial perspective view of the anhydrous ammonia knife.

BEST MODE FOR CARRYING OUT THE INVENTION

Referring now to the drawings, wherein like reference numerals designate identical or corresponding parts throughout the several views, FIG. 1 shows the anhydrous ammonia knife (10) of the present invention attached to an implement tool bar (12). The tool bar (12) is mounted on an implement (not shown) and is carried in a forward direction, generally indicated by the arrow (14), through the soil (16) having an upper surface (18). Although only a single knife (10) is shown in the drawings, it is to be understood that a number of such knives (10) may be mounted in spaced intervals along the tool bar (12). Since the knives (10) are identical in construction, only one is shown and described.

As best shown in FIGS. 1 and 4, the anhydrous ammonia knife (10) includes an elongated substantially straight shank (20) having an upper end (22), a lower end (24), lateral sides (26 and 28), a forward edge (32) and a following edge (34). The shank (20) could, of course, be curved forwardly or rearwardly rather than being straight as illustrated in the drawings. The following edge (34) of the shank (20) has a number of vertically spaced slots (36) formed therein. A sealer plate (40) is received in one of the slots (36) and secured in position by a suitable means such as welding. The sealer plate (40) is disposed rearwardly and laterally of the shank (20) and the trailing edge (42) contacts the soil surface (18) to completely close the furrow formed in the soil (14) by the ammonia knife (10).

Referring now to FIGS. 1–4, a knife segment (50) is attached to the forward edge (32) of the shank (20) by welding or other means. The knife segment (50) includes a leading edge (52) and spaced lateral sides (54 and 56). The spaced lateral sides (54 and 56) extend rearwardly and overlap the lateral sides (26 and 28) of the shank (20) and form a cavity (58). The lower section (62) of the knife segment (50) includes open channels (64 and 66) having downwardly and laterally directed beveled surfaces (65 and 67). An ammonia delivery tube (70) is disposed within the cavity (58) and has an upper end (72) connected by a hose (74) to an ammonia supply tank (not shown), and a lower end (76) disposed in fluid communication with the open channels (64 and 66) and with the soil (16).

The operation of the anhydrous ammonia knife (10) of the present invention is believed to be readily apparent and is now briefly summarized. The ammonia knife (10) is attached to the tool bar (12) and is moved through the soil (16) in the direction of the arrow (14) by a prime mover (not shown). As the ammonia knife (10) moves forward, a narrow furrow is formed at a predetermined depth in the soil (16). The sealer plate (40) is secured to the shank (20) in the one of the available slots (36) that corresponds to the desired predetermined depth. For example, as illustrated in FIG. 1, the sealer plate (40) is secured within the uppermost slot (36) which corresponds to the greatest soil penetration depth of the ammonia knife (10). If a lesser depth was desired, the sealer plate (40) would have been secured to the shank (20) in one of the lower slots (36).

As the furrow is opened by the leading edge (52) of the knife segment (50), anhydrous ammonia is injected into the soil (16) at a position immediately behind the leading edge (52). The open channels (64 and 66) and the beveled surfaces (65 and 67) act to direct the ammonia laterally into the sides of the newly formed furrow where the ammonia is quickly and effectively entrapped in the soil (16). This minimizes the loss of ammonia vapor into the atmosphere.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. An anhydrous ammonia knife comprising:

a shank including an upper end attached to an implement tool bar, a lower end disposed to selectively penetrate soil to a predetermined depth, lateral sides, a forward edge, and a following edge;

a knife segment attached to the forward edge of the shank, the knife segment including lateral sides and a leading edge, forming an internal cavity including open channels formed in the lateral sides immediately adjacent the leading edge which is disposed to open a furrow as it travels forward through the soil; and an ammonia delivery tube disposed within the cavity between the forward edge of the shank and the leading edge of the knife segment, the delivery tube including a discharge end disposed in fluid communication with the soil.

2. The ammonia knife of claim 1 wherein each of the channels includes a beveled contact surface disposed under the tube discharge end and directed downwardly and laterally therefrom.

3. The ammonia knife of claim 2 wherein the lateral sides of the knife segment extend rearwardly and overlap the lateral sides of the shank.

4. The ammonia knife of claim 3 wherein a sealer plate is attached to the following edge of the shank and is disposed rearwardly and laterally of the shank in contact with the soil to close the furrow opened by the leading edge of the knife segment.

5. The ammonia knife of claim 4 wherein a plurality of vertically spaced slots are formed in the following edge of the shank, and wherein the sealer plate is selectively received in one of the slots and secured to the shank.

6. The ammonia knife of claim 2 wherein a sealer plate is attached to the following edge of the shank and is disposed rearwardly and laterally of the shank in contact with the soil to close the furrow opened by the leading edge of the knife segment.

7. The ammonia knife of claim 6 wherein a plurality of vertically spaced slots are formed in the following edge of the shank, and wherein the sealer plate is selectively received in one of the slots and secured to the shank.

8. The ammonia knife of claim 1 wherein a sealer plate is attached to the following edge of the shank and is disposed rearwardly and laterally of the shank in contact with the soil to close the furrow opened by the leading edge of the knife segment.

9. The ammonia knife of claim 8 wherein a plurality of vertically spaced slots are formed in the following edge of the shank, and wherein the sealer plate is selectively received in one of the slots and secured to the shank.

* * * * *